United States Patent [19]

Ohyama et al.

[11] Patent Number: 4,851,935
[45] Date of Patent: Jul. 25, 1989

[54] DRUM ASSEMBLY FOR A MAGNETIC RECORDING AND REPRODUCING APPARATUS

[75] Inventors: Sadahiro Ohyama, Chigasaki; Yoshiaki Morita, Sagamihara; Yoshiaki Ueno, Kawasaki; Kazuhiro Tazawa, Yamato, all of Japan

[73] Assignee: Mitsumi Electric Co., Ltd., Tokyo, Japan

[21] Appl. No.: 50,308

[22] Filed: May 13, 1987

[30] Foreign Application Priority Data

May 14, 1986 [JP] Japan ................................ 61-110243
Jan. 14, 1987 [JP] Japan .................................. 62-6577

[51] Int. Cl.$^4$ .......................... G11B 15/14; G11B 5/02
[52] U.S. Cl. ...................................... 360/64; 360/108
[58] Field of Search ...................... 360/64, 84, 85, 108

[56] References Cited

U.S. PATENT DOCUMENTS

| 3,823,415 | 7/1974 | Fisher et al. | |
| 3,987,490 | 10/1976 | Highnote et al. | |
| 4,120,007 | 10/1978 | Sato | 360/64 |
| 4,455,584 | 6/1984 | Heitmann | |
| 4,497,004 | 1/1985 | Shibata et al. | |
| 4,605,974 | 8/1986 | Ochi et al. | 360/64 |

FOREIGN PATENT DOCUMENTS

| 0074796 | 3/1983 | European Pat. Off. | |
| 0110680 | 6/1984 | European Pat. Off. | |
| 2411402 | 10/1974 | Fed. Rep. of Germany | |
| 3232610 | 3/1984 | Fed. Rep. of Germany | |
| 54-121714 | 9/1979 | Japan | 360/64 |
| 58-182105 | 2/1983 | Japan | 360/64 |
| 59-96509 | 4/1984 | Japan | 360/64 |
| 59-96510 | 4/1984 | Japan | 360/64 |
| 60-242502 | 2/1985 | Japan | 360/64 |
| 1154413 | 6/1969 | United Kingdom | |
| 1497919 | 1/1978 | United Kingdom | |

Primary Examiner—Donald McElheny, Jr.
Attorney, Agent, or Firm—Michael N. Meller

[57] ABSTRACT

A drum assembly for carrying a plurality of rotary recording and reproducing heads of a magnetic recording and reproducing apparatus recording and reproducing a signal on and from a magnetic recording medium in a rotative manner. The drum assembly comprises a stationary drum fixed on a magnetic recording and reproducing apparatus body, a rotary body supported on the stationary drum in a rotative manner for carrying the plurality of rotary recording and reproducing heads, amplifying means disposed in the rotary body for amplifying the reproducing signal supplied from the plurality of rotary recording and reproducing heads, and signal transmitting means at an interface between the stationary drum and the rotary body for transmitting the recording signal from a recording and reproducing circuit to the plurality of rotary recording and reproducing heads and for transmitting the reproduced signal reproduced by the rotary recording and reproducing heads and amplified by the amplifying means to the recording and reproducing circuit.

3 Claims, 13 Drawing Sheets

ROTARY DRUM ——|—— STATIONARY DRUM

TIME

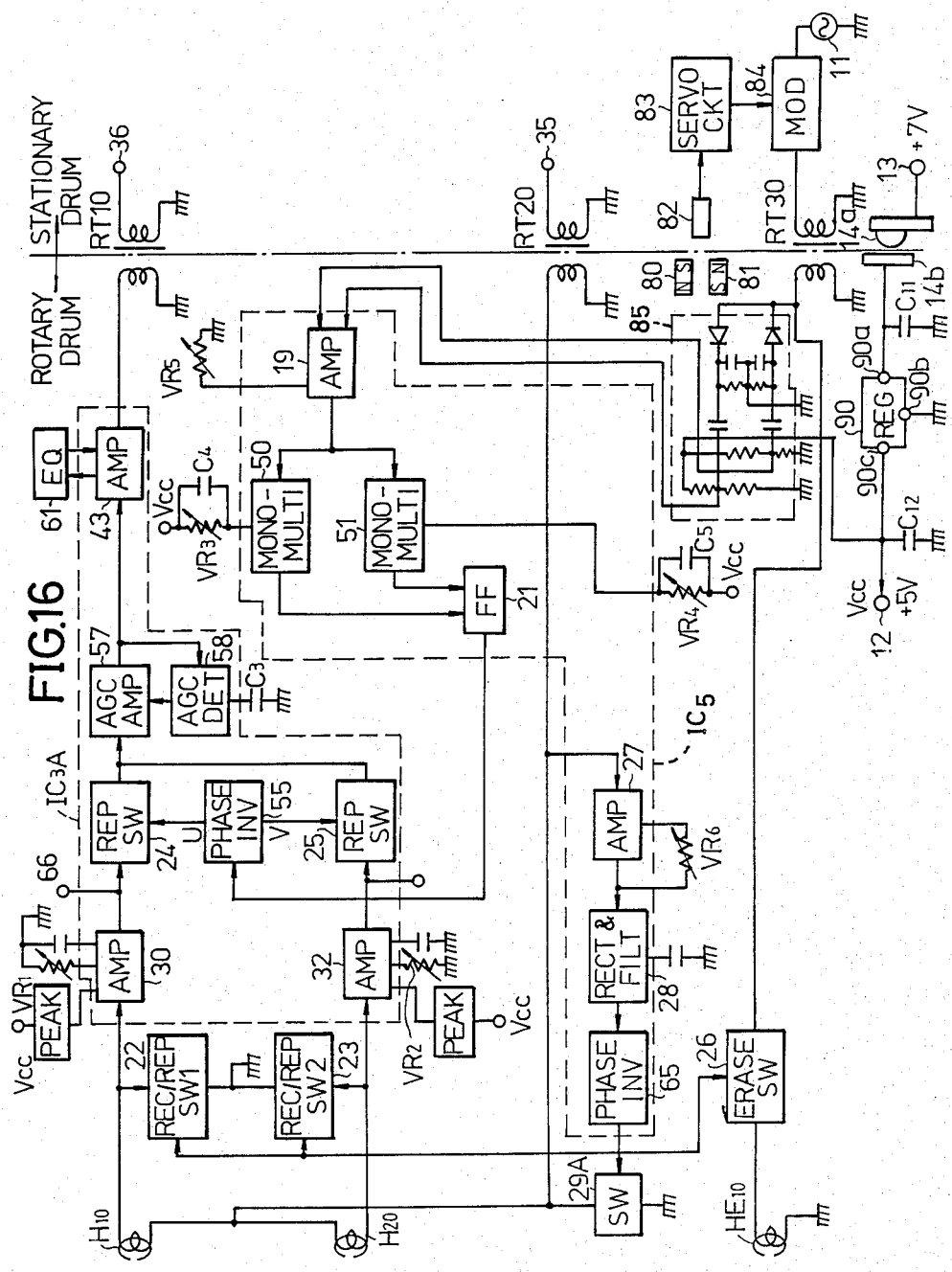

DRUM ASSEMBLY FOR A MAGNETIC RECORDING AND REPRODUCING APPARATUS

BACKGROUND OF THE INVENTION

The present invention generally relates to magnetic recording and apparatuses for recording and reproducing signals on and from a recording medium by means of rotary recording and reproducing heads, and more particularly to a drum assembly for use in such a magnetic recording and reproducing apparatus for carrying the rotary recording and reproducing heads.

Magnetic recording and reproducing apparatuses such as video tape recorders (VTR) and digital audio tape recorders with rotary recording and reproducing heads (R-DAT) record and reproduce signals such as video signals, digital audio signals and the like on and from a recording medium such as a magnetic tape by means of two or four rotary magnetic heads mounted on a rotary body. In such a magnetic recording and reproducing apparatus, recording signals and reproduced signals are transmitted between the rotary recording and reproducing head and a recording and reproducing circuit disposed in a main body of the magnetic recording and reproducing apparatus through a rotary transformer locating at an interface between the rotary body and a stationary drum fixed to the main body of the magnetic recording and reproducing apparatus. The stationary drum supports the rotary body in a rotative manner and comprises an electrical means electrically connected the recording and reproducing circuit. Conventionally, a same number of rotary transformers as to the number of the rotary recording and reproducing heads are used, and a rotary recording and reproducing head corresponds to a rotary transformer in one to one correspondence. Thus, each rotary recording and reproducing head is connected to a corresponding rotary transformer within the rotary body.

Generally, video tape recorders capable of performing various reproducing functions such as a still picture reproducing, slow motion reproducing and the like use a greater number, for example, five, six or more of rotary recording and reproducing heads. It is also noted that so called 8 mm VTR cameras and R-DAT apparatuses use rotary body which diameters are considerably smaller as compared to the video tape recorders of the usual VHS or beta systems. Thus, there is a problem that a space for mounting a rotary transformer in such a rotary body is limited and that the number of the rotary transformers to be mounted in a rotary body is reduced.

A reproduced signal from the rotary recording and reproducing head is usually faint and easily interfered by external noises as the signal is transmitted from the rotary recording and reproducing head to the recording and reproducing circuit of the magnetic recording and reproducing apparatus through the rotary transformer. Thus, there is a problem that a signal to noise ratio of the reproduced signal is easily deteriorated.

SUMMARY OF THE INVENTION

Accordingly, it is a general object of the present invention to provide a novel and useful drum assembly for a magnetic recording and reproducing apparatus wherein the problems aforementioned are eliminated.

Another and more specific object of the present invention is to provide a drum assembly for a magnetic recording and reproducing apparatus, wherein the drum assembly comprising a rotary body for carrying a plurality of rotary recording and reproducing heads for recording and reproducing signals to and from a recording medium, a stationary drum electrically connected to recording and reproducing circuits of the magnetic recording and reproducing apparatus, amplifying means disposed in the rotary body for amplifying the signals reproduced by the plurality of rotary recording and reproducing heads, and signal transmitting means for transmitting a recording signal from the stationary drum to the plurality of rotary recording and reproducing heads and for transmitting a reproduced signal reproduced by the rotary recording and reproducing head and amplified by the amplifying means to the stationary drum, electrically connected to the recording and reproducing circuit. According to the present invention, a faint signal reproduced by the rotary recording and reproducing head is amplified by the amplifying means disposed directly adjacent to the rotary recording and reproducing head within the rotary body so that the reproduced signal is immune to external noises and the signal to noise ratio of the reproduced signal is improved.

Another object of the present invention is to provide a drum assembly for a magnetic recording and reproducing apparatus, in which the drum assembly comprising a rotary body for carrying a plurality of rotary recording and reproducing heads for recording and reproducing signals to and from a recording medium, a stationary drum electrically connected to recording and reproducing circuits of the magnetic recording and reproducing apparatus, first switching means disposed in the rotary body for switching the plurality of rotary recording and reproducing heads responsive to a rotation of the rotary body and signal transmitting means for transmitting a recording signal from the stationary drum to the plurality of rotary recording and reproducing heads and for transmitting a reproduced signal from the plurality of rotary recording and reproducing heads to the stationary drum, wherein the signal transmitting means comprises a first rotary transformer for carrying the reproduced signal and a second rotary transformer for carrying the recording signal. According to the present invention, the recording signal and the reproduced signal are transmitted between the rotary recording and reproducing heads on the rotary body and the stationary drum electrically connected to the recording and reproducing circuit by means of two rotary transformers even in such a case that the number of the rotary recording and reproducing heads is increased. Thus, the present invention uses a small number of the rotary transformers, and the rotary transformers can be formed at an interface between the rotary body and the stationary drum even though the number of the rotary recording and reproducing heads is increased.

Another object of the present invention is to provide a drum assembly for a magnetic recording and reproducing apparatus, in which the drum assembly comprising a rotary body for carrying a plurality of rotary heads for recording and reproducing signals to and from a recording medium, a stationary drum electrically connected to recording and reproducing circuits of the magnetic recording and reproducing apparatus, amplifying means disposed in the rotary body for amplifying the reproduced signal reproduced by the plurality of rotary recording and reproducing heads, first switching means disposed in the rotary body for switching a plurality of rotary recording and reproducing heads responsive to a rotation of the rotary body, and a power supply means for supplying an electrical power from the stationary drum to the amplifying means, wherein the power supply means comprises a third rotary transformer for supplying an alternate current (AC) from the stationary drum to the amplifying means and first switching means on the rotary body and a rectifying and filtering circuit disposed in the rotary body for converting the alternate current to a direct current (DC). The alternate current is also used as an erasing signal. According to the present invention, the erasing signal and the electrical power driving the amplifying means and first switching means are supplied from the stationary drum to the amplifying means and the first switching means on the rotary body through the third rotary transformer, and the construction of the drum assembly is simplified.

Still another object of the present invention is to provide a drum assembly for a magnetic recording and reproducing apparatus, in which the drum assembly comprising a rotary body for carrying a plurality of rotary heads for recording and reproducing signals to and from a recording medium, amplifying means disposed in the rotary body for amplifying the signal reproduced by the plurality of rotary recording and reproducing heads, and first switching means for switching a plurality of rotary recording and reproducing heads responsive to a rotation of the rotary body, wherein the amplifying means and the first switching means are integrated into a semiconductor chip disposed in the drum assembly. According to the present invention, the number of parts to be mounted in the rotary body is significantly reduced.

Still another object of the present invention is to provide a drum assembly for a magnetic recording and reproducing apparatus, in which the drum assembly comprising a rotary body for carrying a plurality of rotary heads for recording and reproducing signals to and from a recording medium, a stationary drum electrically connected to recording and reproducing circuits of the magnetic recording and reproducing apparatus, switching means disposed in the rotary body for switching a plurality of rotary recording and reproducing heads responsive to a rotation of the rotary body, a third rotary transformer for supplying an erasing signal from the stationary drum to the rotary body, a servo control circuit disposed in the stationary drum for controlling the rotation of the rotary body, a modulator disposed in the stationary drum for modulating an amplitude of the erasing signal by a rotation detection signal produced by the servo control circuit and representing the rotation of the rotary body, and a detector disposed in the rotary body for detecting the amplitude modulated erasing signal supplied through the third rotary transformer for obtaining the rotation detection signal and for supplying the obtained rotation detection signal to the switching means as a switching control signal. According to the present invention, the number of the parts is reduced and the assembling work is simplified accordingly.

Still another object of the present invention is to provide a drum assembly for a magnetic recording and reproducing apparatus, in which the drum assembly comprising a rotary body for carrying a plurality of rotary recording and reproducing heads for recording and reproducing signals to and from a recording medium, a stationary drum electrically connected to recording and producing circuits of the magnetic recording and reproductive apparatus, amplifying means disposed in the rotary body for amplifying the signal reproduced by the plurality of rotary recording and reproducing heads, a fourth rotary transformer disposed in the rotary body for transmitting the reproduced signal and the recording signal between the rotary recording and reproducing head on the rotary body and the stationary drum, and a second switching means for controlling the supply of the recording signal and the reproduced signal in such a manner that the recording signal is supplied from the fourth rotary transformer to the plurality of the rotary recording and reproducing heads in a recording mode and the reproduced signal is supplied from the amplifying means to the fourth rotary transformer in a reproducing mode. According to the present invention, a stable direct current can be supplied to the elements disposed in the rotary body.

Further object and feature of the present invention will be apparent from the following detailed description when read in conjunction with the attached drawings.

BRIEF DESCRIPTION OF THE DRAWINGS

FIG. 16 is a system block diagram showing a modification of the drum assembly of FIG. 14.

DETAILED DESCRIPTION

Figure 1:
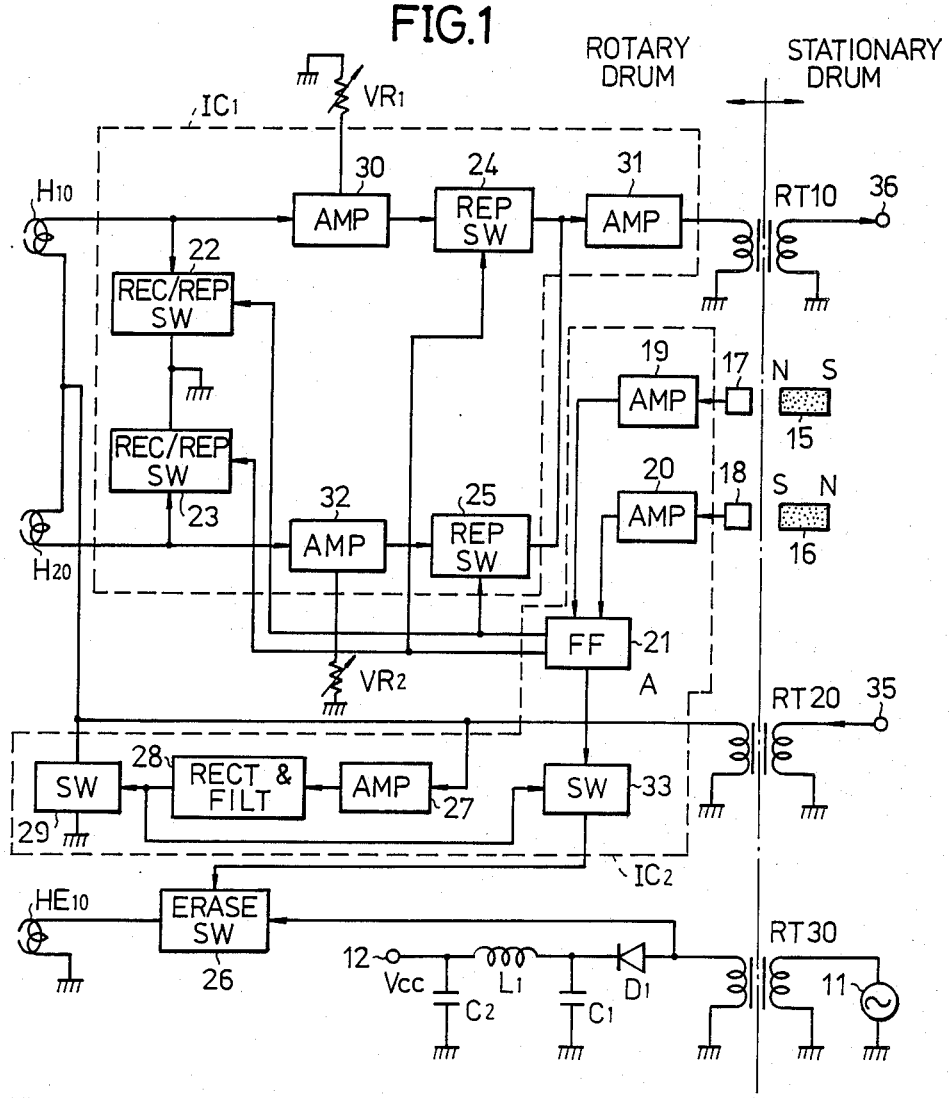
FIG. 1 is a system block diagram showing an embodiment of the drum assembly according to the present invention.

FIG. 1 is a system block diagram showing a circuit of a drum assembly for a magnetic recording and reproducing apparatus according to a first embodiment of the present invention. The embodiment is designed for a so called 8 mm VTR camera having a pair of rotary recording and reproducing heads. The drum assembly comprises a rotary body carrying a plurality of rotary recording and reproducing heads for recording and reproducing and a stationary drum comprising an electrical means electrically connected to recording and reproducing circuits of the magnetic recording and reproducing apparatus. In the drawing, right hand side portion of a one dotted line corresponds to the electrical means disposed in the stationary drum and electrically connected to the recording and reproducing circuits (not shown) of the magnetic recording and reproducing apparatus. The recording and reproducing circuit is disposed in a main body of the magnetic recording and reproducing apparatus (not shown) on which the stationary drum is fixed. The left hand side portion of the one dotted line corresponds to a circuit assembly disposed in the rotary body of which description is as follows.

In the drum assembly of FIG. 1, electrical power is transmitted from the stationary drum to the rotary body by means of a rotary transformer RT30. Thus, an output electrical power from an oscillator 11 oscillating at a frequency greater than 5 MHz is fed to a diode D1 disposed in the rotary body through the rotary transformer RT30. The diode D1 rectifies the current supplied thereto and supplies a rectified current to a terminal 12 through a filtering circuit comprising a choke coil L1 and capacitors C1 and C2. Thus, a D.C. voltage Vcc is obtained from the terminal 12. The D.C. voltage Vcc is used for driving the circuits disposed in the rotary body as will be described in later. In the drawing, electrical connection for feeding the D.C. voltage Vcc to respective circuit component in the rotary body is omitted for simplicity. Such a method of feeding electrical power through the rotary transformer RT30 from the stationary drum to the rotary body as described uses no mechanical contact, so that the life time of the drum assembly is extended.

Figure 2:
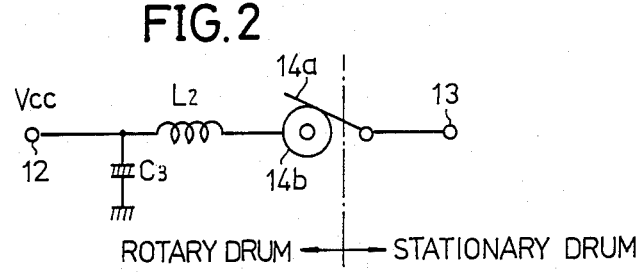
FIG. 2 is a circuit diagram showing a circuit for supplying a direct current to a rotary body in the drum assembly of FIG. 1.

FIG. 2 shows another embodiment of the electrical power feeding circuit for use in the drum assembly of the present invention. In FIG. 2, a direct current voltage applied to a terminal 13 disposed in the stationary drum is supplied to a slip ring 14b disposed in a rotary body through a brush 14a. The brush 14a and the slip ring 14b contact each other mechanically, and a brush noise may be produced when the brush detaches from the slip ring. This brush noise is eliminated by a LC filter comprising a coil L2 and a capacitor C3 and a direct current voltage Vcc is obtained from the output terminal 12.

The stationary drum 15 and 16 are provided with magnets 15 and 16 disposed in such a manner that they oppose each other across a diameter of the stationary drum. Thereby, the magnetic poles of the magnets 15 and 16 are also opposed each other and the N pole of one of the magnets faces the S pole of the other magnet. The rotary body is provided with magnetic sensors 17 and 18 for sensing magnetic fields produced by the magnets 15 and 16. The magnetic sensors 17 and 18 are disposed on the rotary body such that they locate at positions corresponding to rotary recording and reproducing heads H10 and H20 also carried by the rotary body in a diametrically opposing manner and produce output pulses having a mutually opposing polarity. These output pulses are amplified by amplifiers 19 and 20 and supplied to a flip-flop 21. The flip-flop 21 is set by the output pulse from the magnetic sensor 17 and is cleared by the output pulse from the magnetic sensor 18 and produces a square wave switching control signal.

This switching control signal is supplied to respective switching control signal input terminals of switching circuits 22-25 and controls the conduction of these switching circuits 22-25. For example, the switching control signal from the flip-flop 21 assumes a high level for those intervals in which the magnetic head H10 is passing across a magnetic tape. Thus, the switching circuits 22 and 24 are switched to a conducting state and the switching circuits 23 and 25 are switched to a non-conducting state responsive to the switching control signal. For such a case that the rotary recording and reproducing head H20 is passing across the magnetic tape, a low level switching control signal is produced by the flip-flop 21 and the switching circuits 22-25 are switched in an opposite manner to the former state aforementioned.

When a recording signal is applied to a terminal 35 in a recording mode of the magnetic recording and reproducing apparatus, the recording signal is transmitted to the circuit assembly on the rotary body through a rotary transformer RT20 and supplied to an amplifier 27 and a rectifying and filtering circuit 28. The rectifying and filtering circuit 28 converts the recording signal to a high level direct current voltage which is supplied to a switching control signal input terminal of a switching circuit 29 and switches the switching circuit 29 to a non-conducting state. As a result, the recording signal is supplied to the rotary recording and reproducing heads H10 and H20. In such a case that the rotary recording and reproducing head H10 is passing across the magnetic tape (not shown) with the rotation of the rotary body, the switching circuit 22 conducts and one terminal of the rotary recording and reproducing head H10 is grounded. Thus, a recording current representing the recording signal flows through the rotary recording and reproducing head H10 and the recording signal is recorded on the magnetic tape by the head H10. At this instance, the switching circuit 23 is in the non-conducting state and no recording current flows through the rotary recording and reproducing head H20. On the other hand, when the rotary recording and reproducing head H20 is passing across the magnetic tape, the switching circuit 22 and 23 are switched in such a manner that the recording current flows through the rotary recording and reproducing head H20 and the recording signal is recorded on the magnetic tape by the head H20. Thus, the switching circuit controls the current flowing through the rotary recording and reproducing head in such a manner that the recording current only flows through that rotary recording and reproducing head which is actually passing across the magnetic tape at that moment, and the electrical power of the recording current is reduced to one half as compared to the case that both of the rotary recording and reproducing heads are operated continuously. Next, description will be given to the operation of the drum assembly for the magnetic recording and reproducing apparatus in a reproducing mode. In the reproducing mode, the recording signal does not exist, so that the output signal from the rectifying and filtering circuit 28 disappears and a low level signal is produced therefrom. Responsive to this low level output signal from the rectifying and filtering circuit 28, the switching circuit 29 is switched to a conducting state and one of the terminals of the rotary recording and reproducing heads H10 and H20 are respectively grounded. When the rotary recording and reproducing head H10 is passing across to the magnetic tape, the switching circuits 23 and 24 are in a conducting state and the reproduced signal is supplied to an output terminal 36 in the stationary drum from the rotary recording and reproducing head H10 through a path comprising an amplifier 30, switching circuit 24, amplifier 31 and a rotary transformer RT10. At this moment, the rotary recording and reproducing head H20 is not in contact with the magnetic tape. In order to avoid the detection of the external noises by the rotary recording and reproducing head H20 not passing across the magnetic tape, the rotary recording and reproducing head H20 is grounded by the switching circuit 23. In such a case that the rotary recording and reproducing head H20 is passing across the magnetic tape, on the other hand, the switching circuit 22 and 25 are conducted and the switching circuit 23 is not conducted. Thus, the reproduced signal is supplied to the output terminal 36 in the stationary drum from the rotary recording and reproducing head H20 through a path comprising an amplifier 32, switching circuit 25, amplifier 31 and the rotary transformer RT10.

The amplifiers 30 and 32 have a very high impedance such as several kilo ohms as compared to the output impedance of the rotary recording and reproducing head which is usually 75 ohm. Accordingly, the reproduced signal produced by the rotary recording and reproducing heads H10 and H20 are supplied to the amplifiers 30 and 32 without substantial attenuation. The reproduced signals from the rotary recording and reproducing heads H10 and H20 are amplified by the amplifiers which are locating directly adjacent to the rotary recording and reproducing heads H10 and H20, so that the reproduced signal becomes immune to the effect of the external noises and the signal to noise ratio is improved. The amplification factor of the amplifiers 30 and 32 are variable by means of variable resistors VR1 and VR2.

Reproducing heads used in a magnetic recording and reproducing apparatus are generally associated with variation of characteristics such as reproducing sensitivity, impedance and quality factor which should be identical in a pair of rotary recording and reproducing heads such as the heads H10 and H20 used in a magnetic recording and reproducing apparatus. Such a work for adapting a pair of rotary recording and reproducing heads so that they have an identical characteristic is known as "pairing" in the art which causes a problem in the manufacturing process. The present invention provides a solution to this problem by disposing an amplifier with variable amplification factor within the rotary body and adjusting the amplification factor such that the sensitivity for the respective rotary recording and reproducing heads becomes identical. Such an adjustment of the amplification factor of the amplifier in the rotary body can be carried out for individual rotary body which constitute a component to be assembled in the magnetic recording and reproducing apparatus. Thus, the rotary body having a satisfactory characteristic can be supplied to a manufacturing line of the magnetic recording and reproducing apparatus and the adjustment in a later manufacturing stage is eliminated.

Next, description will be given to the operation of a rotary erasing head HE10. The rotary erasing head HE10 is mounted on the rotary body in such a manner that the head HE10 occupies a position which is rotated by an angle of 90° relative to the position of the rotary recording and reproducing heads H10 and H20 (not shown). The rotary erasing head HE30 erases the portion of the magnetic tape to be swept by the rotary recording and reproducing heads H10 and H20 in advance. The rotary erasing head HE30 has a gap which is twice as large as the gap of the rotary recording and reproducing heads H10 and H20 so that the rotary erasing head erases the portion of the magnetic tape corresponding to the recording tracks for the rotary recording and reproducing heads H10 and H20. The rotary erasing head HE10 is controlled the supply of an erasing current thereto by a switching circuit 26 operating responsive to the switching control signal from the flip-flop 21 in such a manner that for those intervals corresponding to a 180° rotation of the rotary erasing head HE10 in which the head HE10 is passing across the magnetic tape surface, the erasing current is supplied from the rotary transformer RT30. For those intervals corresponding to another 180° rotation of the rotary erasing head HE10 in which the head HE10 is separated from the magnetic tape surface, the erasing current is not supplied from the rotary transformer RT30. Thus, the rotary erasing head HE10 does not consume electrical power when the head HE 10 is not passing across the surface of the magnetic tape and the saving of electrical power consumption is achieved. The rotary erasing heads is operated only in the recording mode and not operated in the reproducing mode. For this purpose, the output signal from the rectifying and filtering circuit 28 is supplied to a switching circuit 33 so that the switching circuit 33 is controlled the operation in such a manner that the switching circuit 33 passes the switching control signal from the flip-flop 21 to the switching circuit 26 only for such an instance that the magnetic recording and reproducing apparatus is operated at the recording mode. Otherwise, the switching circuit is turned OFF.

Figure 3:
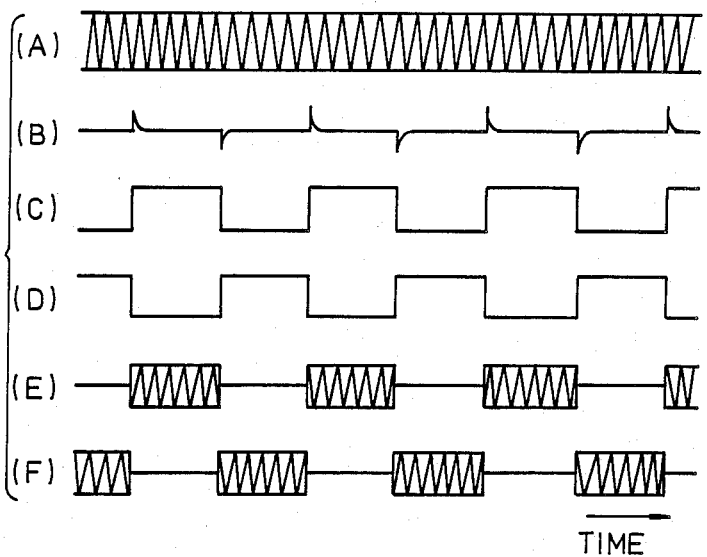
FIGS. 3 and 4 are diagrams showing wave forms for explanation of the operation of the drum assembly in FIG. 1.

FIGS. 3(A)–3(F) show wave forms of the recording signal and the switching control signal appearing in the drum assembly when the magnetic recording and reproducing apparatus is in the recording mode. FIG. 3(A) shows a wave form of a recording signal supplied from the rotary transformer RT20. FIG. 3(B) shows a wave form of a pulse supplied from the magnetic sensors 17 and 18 to the flip-flop 21. FIG. 3(C) shows a wave form of a switching control signal produced by the flip-flop 21 and supplied to the switching circuits 22 and 25 for controlling the switching operation thereof. FIG. 3(D) shows a wave form of a switching control signal produced by the flip-flop 21 and supplied to the switching circuits 23 and 24 for controlling the switching operation thereof. FIG. 3(E) shows a signal wave form of a recording signal to be supplied to the rotary recording and reproducing head H10. FIG. 3(F) shows a signal wave form of a recording signal to be supplied to the rotary recording and reproducing head H20.

Figure 4:
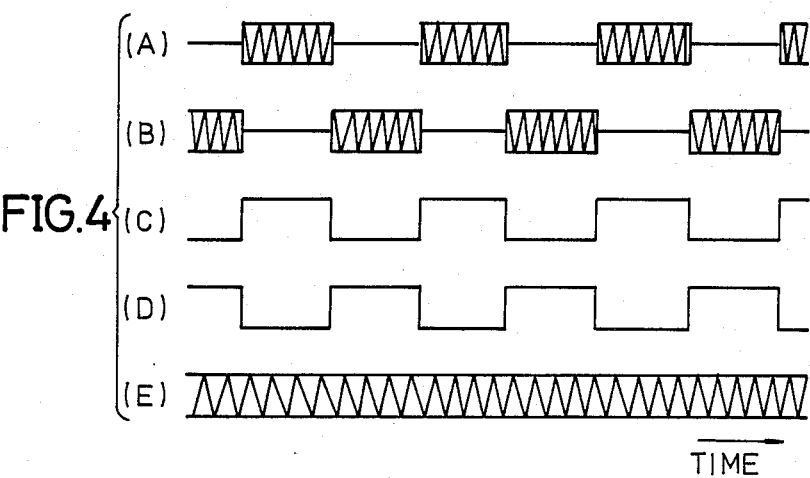

FIGS. 4(A)–4(E) show the wave forms of the reproduced signal and the switching control signal appearing in the drum assembly when the magnetic recording and reproducing apparatus is in the reproducing mode. FIG. 4(A) shows a wave form of a reproduced signal from the rotary recording and reproducing head H10. FIG. 4(B) shows a wave form of a reproduced signal from the rotary recording and reproducing head H20. FIGS. 4(C) and 4(D) show wave forms of switching control signals supplied to the switching circuits 22–25 for controlling the switching operation thereof. FIG. 4(E) shows a signal wave form of a signal synthesized by summing the reproduced signals from the rotary recording and reproducing heads H10 and H20. The signal shown in FIG. 4(E) is amplified by the amplifier 31 and supplied to the output terminal 36 of the stationary drum through the rotary transformer RT10.

The circuit portion IC1 defined by a dashed line in FIG. 1 is a first integrated circuit comprising the amplifiers 30-32 and switching circuits 22-25 which are integrated into a monolithic semiconductor chip. The circuit portion IC2 defined by a dotted line in FIG. 1 is a second integrated circuit comprising the amplifiers 19, 20 and 27, flip-flop 21, switching circuits 29 and 33, and a rectifying and filtering circuit 28 which are integrated into a monolithic semiconductor chip.

Figure 5:
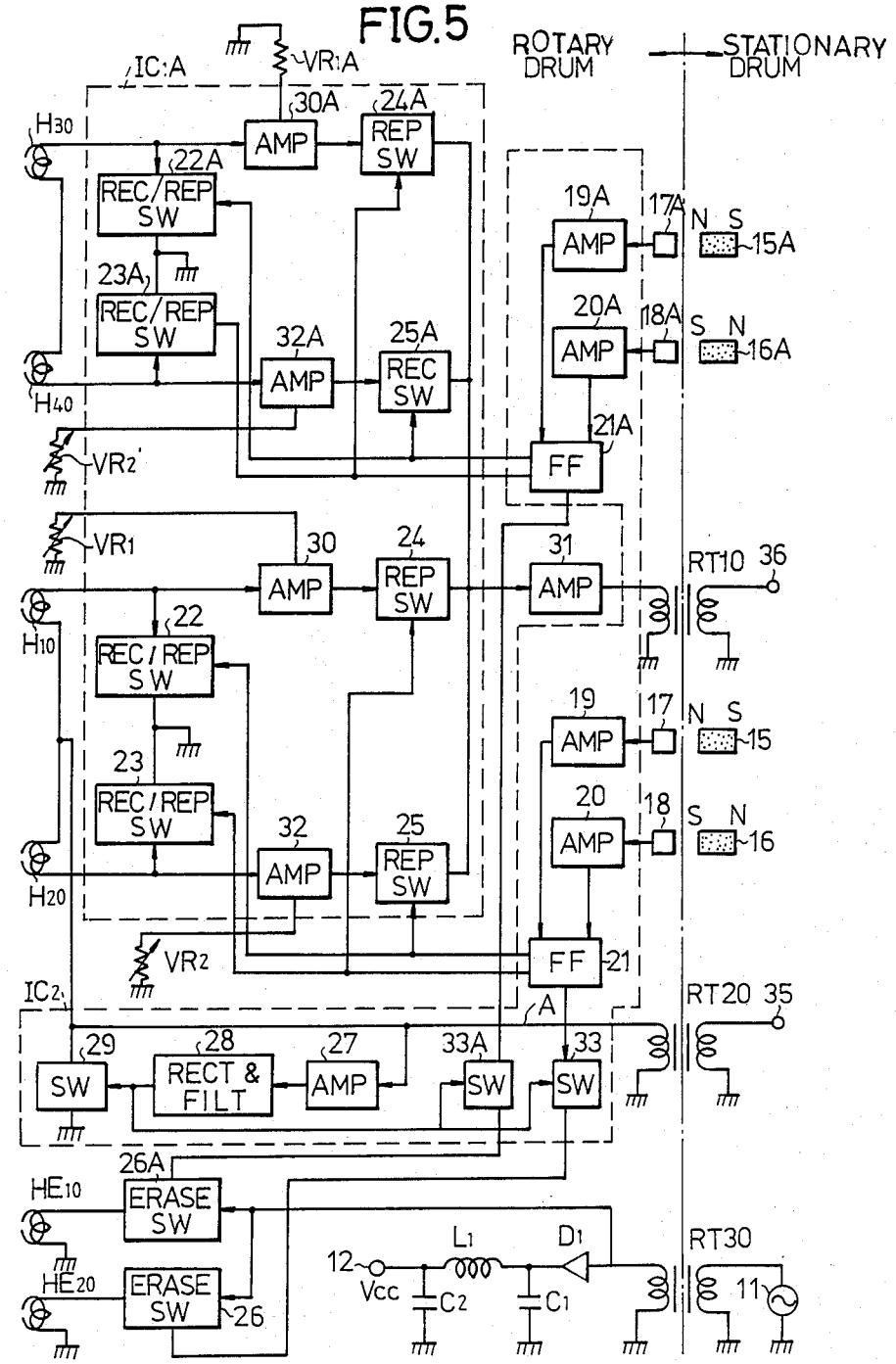
FIG. 5 is a system block diagram showing another embodiment of the drum assembly according to the present invention in which four rotary recording and reproducing heads are carried on a rotary body.

FIG. 5 is a systematic block diagram showing another embodiment of the drum assembly according to the present invention, in which the drum assembly comprises four rotary recording and reproducing heads. In the present embodiment, the rotary heads H30 and H40 are exclusively used for reproducing, and circuits associated thereto are added to the drum assembly of FIG. 1. The circuits added in the present embodiment is essentially the same as the circuit described with reference to FIG. 1. Accordingly, those parts which are constructed identically to those corresponding parts in FIG. 1 are given the same reference numerals and the descriptions thereof will be omitted.

The rotary reproducing heads H30 and H40 are mounted on the rotary body in a diametrically opposing manner in which the heads H30 and H40 are aligned on a diametrical line which is perpendicular to the diametrical line connecting the rotary recording and reproducing heads H10 and H20. Further, magnets 15A and 16A are disposed on the stationary drum in a diametrically opposing manner on a hypothetical line which is perpendicular to the line connecting the magnets 15 and 16. Furthermore, magnetic sensors 17A and 18A are mounted on the rotary body such that the locations of the sensors 17A and 18A correspond to the location of the reproducing heads H30 and H40. Further the erasing head HE10 and another erasing head HE20 are mounted on the rotary body in a diametrically opposing manner and erase the signals on the magnetic tape in advance to the recording by the magnetic heads H10 and H30 and in advance to the recording by the magnetic heads H20 and H40, respectively. When a recording signal is recorded on a magnetic tape, the recording and reproducing heads H10 and H20 are used as described previously. In a normal reproducing mode, the recording and reproducing heads H10 and H20 are used in a similar manner as described previously. When a slow motion picture or a still picture is to be reproduced, all of the four heads H10-H40 are used. This operation of reproducing the slow motion picture and the still picture may be carried out according to the VHS or beta system. Thus, a portion of a recording track is reproduced by the recording and reproducing head H10 and a portion of another track adjacent to the first mentioned recording track is reproduced by the reproducing head H30. The reproduced signal from the heads H10 and H30 are combined by the amplifier 31 and a signal corresponding to one full field is reproduced. Further, the recording and reproducing head H20 and the reproducing head H40 respectively reproduce a pair of tracks adjacent to the aforementioned pair of tracks in a similar manner. The reproduced signals from the heads H20 and H40 are combined in the amplifier 31. The reproduced signal thus obtained from the amplifier 31 is then supplied to the output terminal 36 through the rotary transformer RT10. Each of the erasing heads HE10 and HE20 erases respective one of the recording tracks as compared to the case of the first embodiment in which the erasing head erases two tracks simultaneously. As a result, erroneous erasing of a track at the time of recording and thus the loss of the signals desirable to be maintained are avoided. A circuit portion IC1A indicated by the dashed line in FIG. 5 is an integrated circuit comprising the switching circuits 22-25, 22A-25A, and amplifiers 30-32 and 30A-32A.

Figure 7:
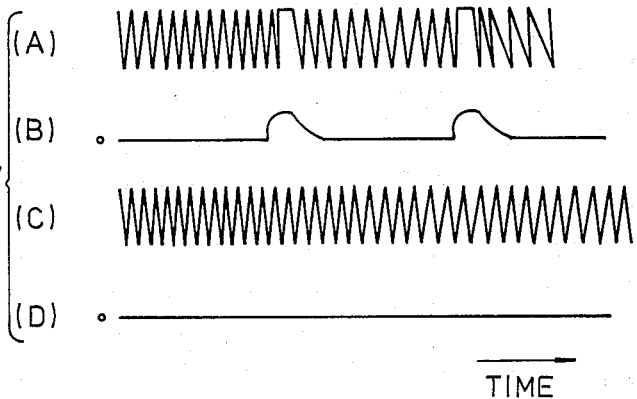
FIG. 7 is a diagram showing wave forms appearing in the drum assembly in FIG. 6.
Figure 6:
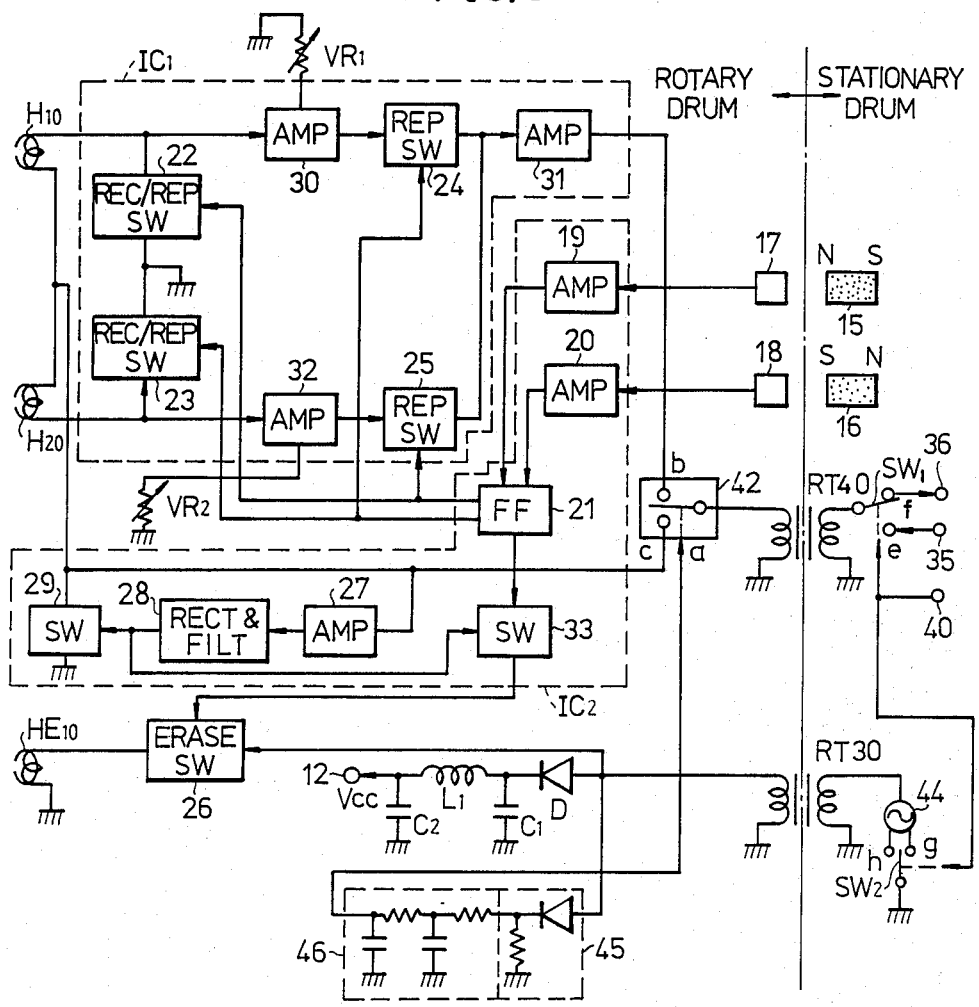
FIG. 6. is a system block diagram showing another embodiment of the drum assembly according to the present invention.

FIG. 6 is a system block diagram of the drum assembly for a magnetic recording and reproducing apparatus according to another embodiment of the present invention. In the drawing, those parts which are identical to those corresponding parts in FIG. 1 are designated by the same reference numerals and the descriptions thereof will be omitted. In the drum assembly of FIG. 6, the number of the rotary transformers used for signal transmission between the rotary body and the stationary drum is reduced from two to one. Thus, the recording signals from the rotary recording heads H10 and H20 are supplied to the output terminal 36 in the stationary drum through a rotary transformer RT40 and the recording signal applied to an input terminal 35 in the stationary drum is supplied to the rotary recording and reproducing heads H10 and H20 through the rotary transformer RT40. In the recording mode, a mode discrimination signal indicating the recording mode of the magnetic recording and reproducing apparatus is applied to a terminal 40 and a switch SW1 is switched to a contact e to which the recording signal is applied from the input terminal 35. As a result, the recording signal is supplied to the rotary transformer RT40 and further to the rotary recording and reproducing heads H10 and H20 through a switching circuit 42 of which description will be given in later. In the reproducing mode, the reproduced signals from the rotary recording and reproducing heads H10 and H20 are supplied to the output terminal 36 through the amplifier 31, switching circuit 42 from contact b to a, rotary transformer RT40, and the witch SW1 which is switched to a contact f by the mode discrimination signal. An oscillator 44 is used to supply an electrical power to the circuit assembly in the rotary body. The output signal of the oscillator 44 is also used s a switching control signal for the switching circuit 42. This electrical power is transmitted by the rotary transformer RT30. FIGS. 7(A) and 7(C) show signal wave forms of the output signal from the oscillator 44. FIG. 7(C) shows the signal wave form of the oscillator 44 oscillating at a frequency of 5 MHz continuously. The signal shown in FIG. 7(A) on the other hand involves high level direct current component appearing at a periodic interval. The signal shown in FIG. 7(A) and the signal shown in FIG. 7(B) are switched by a switch SW2 which is in turn switched by the mode discrimination signal aforementioned. Thus, the switch SW2 is switched to a contact g when the magnetic recording and reproducing apparatus is operated in the recording mode and the switch SW2 is switched to a contact h when the magnetic recording and reproducing apparatus is operated in the reproducing mode. The output of the oscillator 44 is supplied to a rectifying circuit 45 and an integrating circuit 46 through the rotary transformer RT36, wherein the high frequency component is removed by the integrating circuit 46. Thus, a switching control signal supplied to a terminal d of the switching circuit 42 for controlling the switching operation thereof is obtained. The switching circuit 42 is switched to a contact c in the recording mode and the recording signal applied to the contact a is supplied to the terminal c. In the reproducing mode, the switching circuit 42 is switched to the contact b and the reproduced signal applied to the contact b is supplied to the contact c of the switching circuit 42. It should be noted that the switching circuits 22–26, 29, 33, 42 and the switches SW1 and SW2 are all implemented by electronic switching circuits. The integrating circuit 46 produces an output signal shown in FIG. 7(B) responsive to the output signal of the oscillator 44 shown in FIG. 7(A) and an output signal shown in FIG. 7(D) responsive to the output signal of the oscillator 44 shown in FIG. 7(D). Thus, the switching circuit 42 is controlled the switching operation thereof responsive to the switching control signals shown in FIGS. 7(B) and 7(D). It should be noted that the use of one rotary transformer for the transmission of the recording signal and the reproducing signal between the stationary drum and the circuit assembly in the rotary body is also applicable to the magnetic recording and reproducing apparatuses having four rotary magnetic recording and reproducing heads as shown in FIG. 5. In such a case that the two rotary transformers RT10 and the RT20 of FIG. 5 are replaced by one rotary transformer RT40 as shown in FIG. 6, the switching circuit 42 operates in such a manner that the contact b of the switching circuit 42 is connected to an output terminal of the amplifier 31 and the contact c of the switching circuit 42 is connected to a line A in FIG. 5. Thereby, the oscillating wave form of the output signal produced by the oscillator 44 and supplied to the rotary transformer is the same as shown in FIG. 7. According to the present embodiment, one rotary transformer is sufficient for the transmission of the recording signal and the reproducing signal between the rotary body and the stationary drum which is advantageous for compact magnetic recording and reproducing apparatuses such as 8 mm VTR and R-DAT in which the space for the rotary transformer is limited. The combination of the amplifiers 30 and 31 and the combination of the amplitudes 32 and 31 may have a gain of 60 dB, for example.

Figure 8:
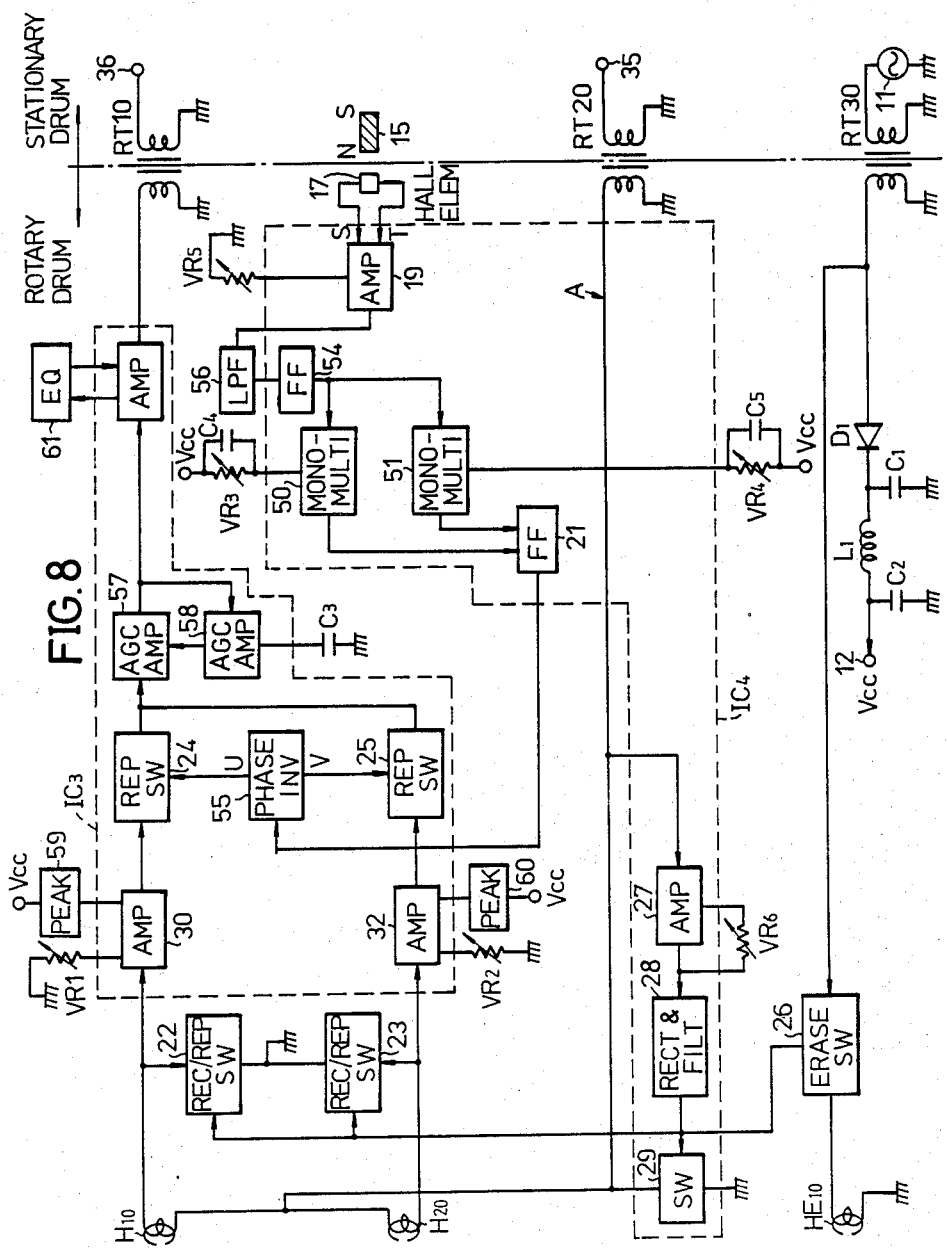
FIG. 8 is a system block diagram showing a modification of the drum assembly in FIG. 1.
Figure 9:
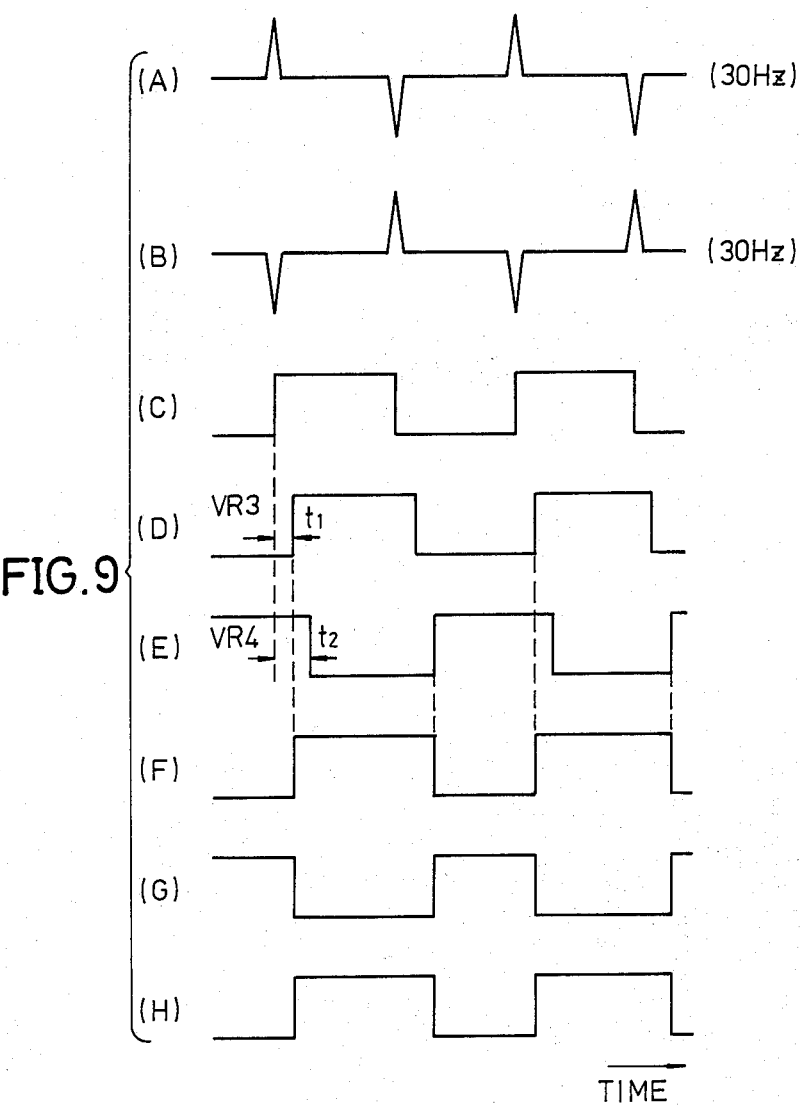
FIG. 9 is a diagram showing wave forms for explanation of the operation of the drum assembly in FIG. 8.

FIG. 8 is a system block diagram showing an embodiment of the drum assembly which is a modification of the first embodiment of FIG. 1 wherein those parts constructed identically to those corresponding parts of FIG. 1 is designated by the same reference numerals and the description thereof will be omitted. In FIG. 8, the switching circuits 22 and 23 are not switched by the switching control signal from the flip-flop 21 but are switched by the output signal of the rectifying and filtering circuit 28. Accordingly, the switching circuits 22 and 23 are not switched as in the manner shown in FIG. 1 in which the switching circuits 22 and 23 are switched between the conducting state and the non-conducting state thereof alternatively for each half rotation of the rotary body for the recording mode and the reproducing mode. Instead, the switching circuits 22 and 23 are conducted responsive to the direct current output from the rectifying and filtering circuit 28 and connect the respective one of the terminals of the rotary recording and reproducing heads H10 and H20 to the ground in the recording mode. In the reproducing mode, the output from the rectifying and filtering circuit disappears, and the reproduced signals from the rotary recording and reproducing heads H10 and H20 are supplied to the amplifiers 30 an 32. In the present embodiment, the amplifiers are not affected by the deteriorative effect caused by the switching of the switching circuits 22 and 23. In FIG. 8, the magnetic sensor 17 is a Hall element connected to input terminals of S and T of the amplifier 19 which is a differential amplifier. The output terminal of the amplifier 19 is connected to a flip-flop 54 through a low-pass filter 56, and an output terminal of the flip-flop 54 is connected to monostable multivibrators 50 and 51. The monostable multivibrators 50 and 51 are associated with variable resistors VR3 and VR4 which control width of output pulses from the respective monostable multivibrators. The square wave output pulse from the flip-flop 21 is modulated the pulse width thereof by the variable width of the output pulses from the monostable multivibrators and a timing of switching operation of the switching circuits 24 and 25 is varied accordingly. Thus, a switching timing of the switching circuits 24 and 25 can be adapted to a reproducing timing of the rotary recording and reproducing heads H10 and H20 so that an error in the synchronization of the switching of the switching circuits and the reproducing operation by the heads can be compensated. This error is caused by the error in the relative positions of the rotary recording and reproducing heads H10, H20, magnetic sensors 17, 18 and the magnets 15 and 16. This compensation will be described in detail with reference to FIG. 9.

FIGS. 9(A) and 9(B) are signal wave form diagrams showing wave forms of signals supplied from the Hall element 17 to the input terminals S and T of the differential amplifier 19. FIG. 9(C) shows the wave form of the output signal from the flip-flop 54 and FIGS. 9(D) and 9(E) show the wave forms of the output signal from the monostable multivibrator 50 and 54. In FIGS. 9(C)–9(E), lag times t1 and t2 indicating the lag time of the output signals from the monostable multivibrators 50 and 51 relative to the output pulse from the flip-flop 54 can be varied by the adjustment of the variable resistors VR3 and VR4. Further, FIG. 9(F) shows the output signal wave form supplied from the flip-flop 21 to a phase inverting circuit 55, and FIGS. 9(G) and 9(H) show output signal wave forms from the phase inverting circuit 55 obtained from output terminals U and V.

Referring to FIG. 8 again, the low pass filter 56 is a filter for eliminating noise from the output signal from the Hall element 17. Variable resistors VR5 and VR6 are variable resistors for adjusting the gain of the amplifiers 19 and 27. AGC amplifier 57, AGC detector 58 and a capacitor C3 form an automatic gain control circuit for maintaining output level of the reproduced signal from the rotary recording and reproducing heads H10 and H20 at a constant level. The amplifiers 30 and 32 are associated with respective peaking circuits 59 and 60 for enhancing the high frequency region of the frequency spectrum of the reproduced signals supplied from the rotary recording and reproducing heads H10 and H20 so that the attenuation of the reproduced signals which is significant at those high frequency regions is compensated. An equalizer 61 is connected to the amplifier 31 for providing a frequency characteristic thereto in such a manner that the reproducing characteristic of the rotary recording and reproducing heads H10 and H20 is compensated and a flat frequency response is obtained. An integrated circuit IC3 designated by the dashed line in FIG. 8 is an integrated circuit comprising the switching circuits 22–25, amplifiers 31, 32, and 57, phase inverting circuit 55 and the AGC amplifier and detector 57 and 58 on a monolithic semiconductor chip. An integrated circuit IC4 is an integrated circuit comprising the amplifiers 19 and 27, rectifying and filtering circuit 28, switching circuit 29, flip-flops 21 and 54 and monostable multivibrators 50 and 51 on a monolithic semiconductor chip.

Figure 10:
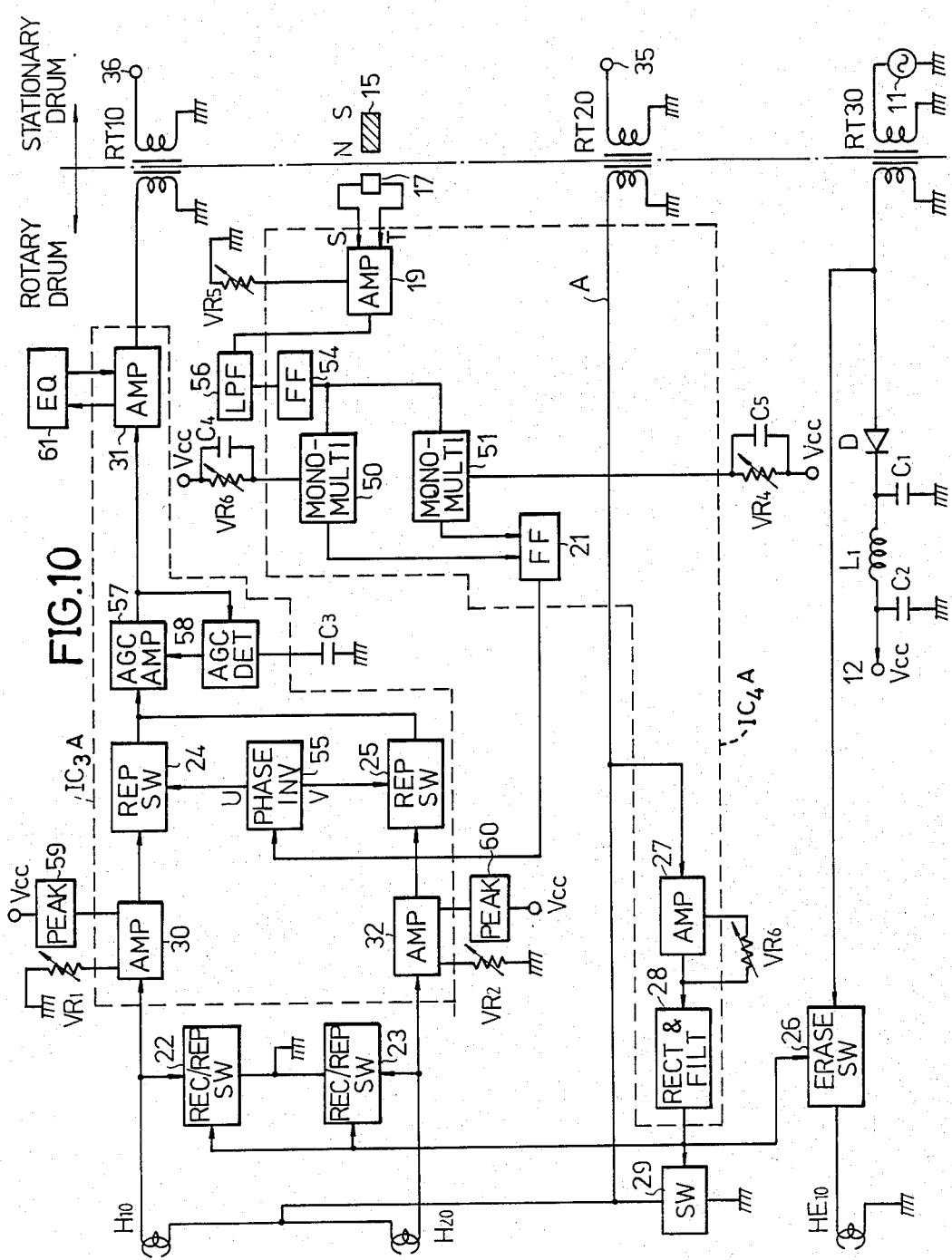
FIG. 10 is a system block diagram showing another modification of the drum assembly of FIG. 8.

FIG. 10 shows a modification of the drum assembly of FIG. 8. In the drawing, those parts constructed identically to those corresponding parts in FIG. 8 are given the same reference numerals and the descriptions thereof will be omitted. In the embodiment of FIG. 10, the switches 22 and 23 are not integrated into an integrated circuit IC3A shown by a dashed line comprising the amplifiers 30, 31 and 32, switching circuits 24 and 25, phase inverting circuit 55, and AGC amplifier and detector 7 and 58. Further, it is noted that the switching circuit 29 is not integrated into an integrated circuit IC4A shown by a dashed line comprising the amplifiers 19 and 27, rectifying and filtering circuit 28, flip-flops 21 and 54 and monostable multivibrators 50 and 51. The amplifier 19 is a differential amplifier having input terminals S and T as in the case of FIG. 8. It is also possible to modify the embodiment of FIG. 8 such that the switching circuits 22 and 23 are integrated into the IC3A and the switching circuit 29 is integrated into the IC4A. This modification is not illustrated in the drawing. Further, it is possible to construct such that the switching circuits 22 and 23 are not included in the integrated circuit IC3A but the switching circuit 29 is integrate into the integrated circuit IC4A. Furthermore, it is possible to construct the integrated circuits IC3A and IC4A in a single integrated circuit chip. In this case, the switching circuits 22, 23 and 29 may also be incorporated into the single integrated circuit. It is further possible to provide these switching circuits outside of the integrated circuit.

Figure 11:
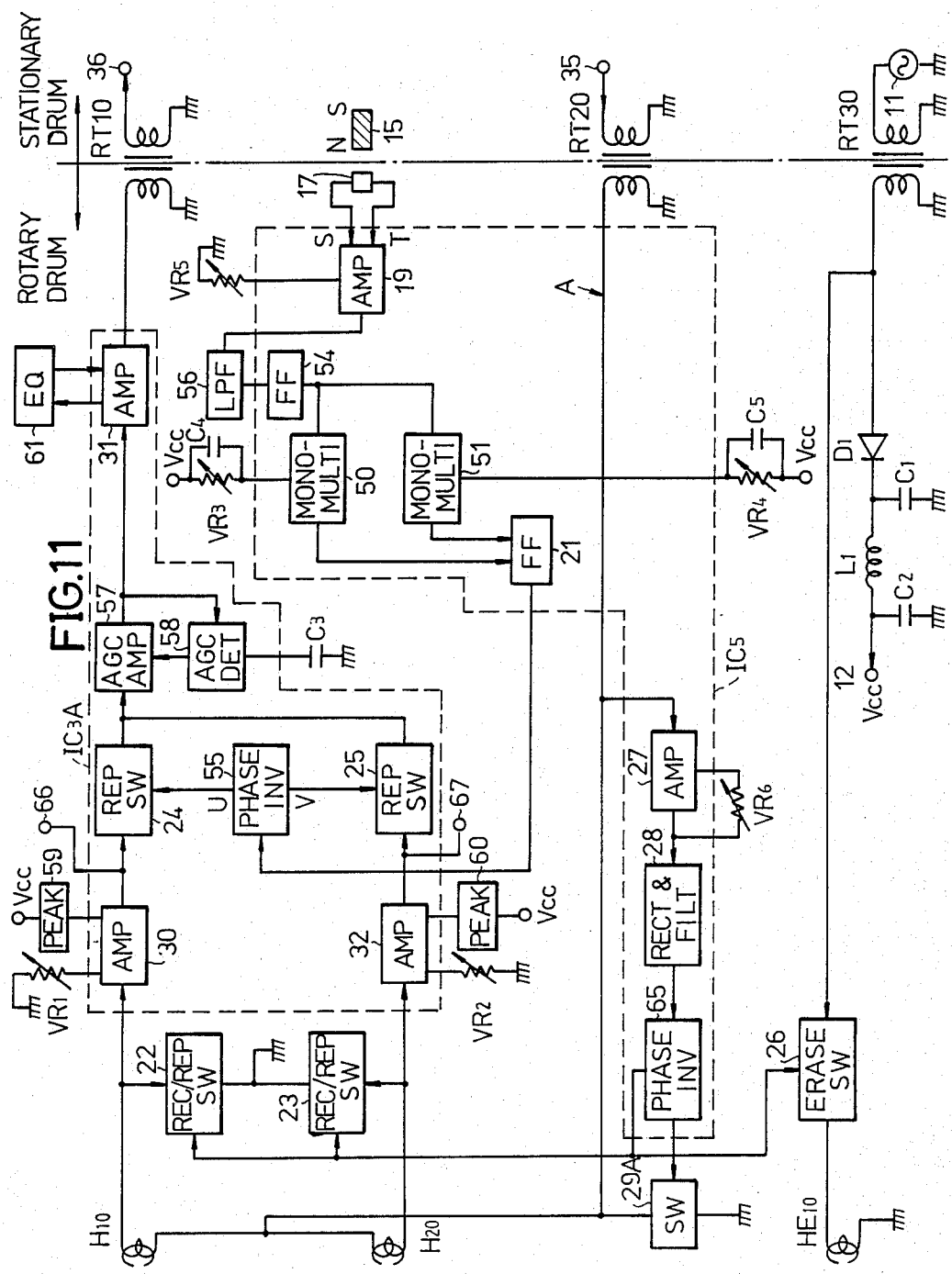
FIG. 11 is a system block diagram showing a further modification of the drum assembly of FIG. 10.

FIG. 11 is a system block diagram showing a modification of embodiment of FIG. 10. In the drawing, those parts which are constructed identically to those corresponding parts in FIG. 10 are given the same reference numerals and the descriptions thereof will be omitted. In the present embodiment, a switching circuit 29A is used instead of the switching circuit 29 and a phase inverting circuit 65 is provided between an output terminal of the rectifying and filtering circuit 28 and a switching control signal input terminal of the switching circuit 29A. Thus, the switching circuit 29A is switched to a non-conducting state in the recording mode responsive to a low level output signal from a phase inverting circuit 65 and switched to a conducting state in the reproducing mode responsive to a high level output signal from the phase inverting circuit. Further, a non-phase inverted output signal is supplied from the phase inverting circuit 65 to switching control signal input terminals of the switching circuits 22 and 23. Furthermore, the amplifiers 19 and 27, flip-flops 21 and 54, rectifying and filtering circuit 28, monostable multivibrators 50 and 51 and the phase inverting circuit 65 are integrated into an integrating circuit IC5. The amplifier 19 is a differential amplifier as in the case of FIG. 10. With this construction a same switching circuit can be used for the switching circuits 22, 23, and 29A. Thus, in such a case that a PNP transistor is used for the switching circuit, for example, the transistors in the switching circuit 22 and 23 are switched to a conducting state responsive to the high level switching control signal supplied thereto through the integrated circuit IC5 in the recording mode. AT this moment, the transistor in the switching circuit 29A is in a non-conducting state as the switching control signal supplied thereto is inverted the phase thereof by the phase inverting circuit 65. Terminals 66 and 67 are output terminals of the amplifiers 30 and 32 from which the gain of the respective amplifiers are monitored.

Figure 12:
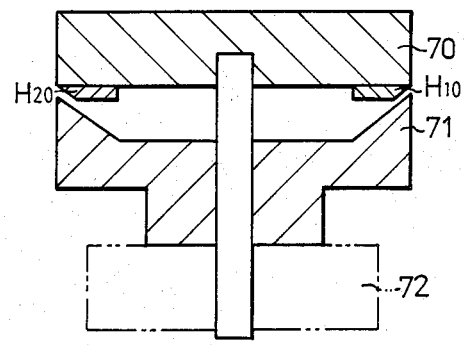
FIGS. 12 and 13 are cross sectional view showing the construction of the drum assembly.

FIG. 12 is a schematic illustration of the cross section of the drum assembly for use in the VHS system. The drum assembly comprises a rotary drum 70, stationary drum 71, and a driving motor 72 for driving the rotary drum 70. The rotary recording and reproducing heads H10 and H20 are mounted on the rotary drum 70.

Figure 13:
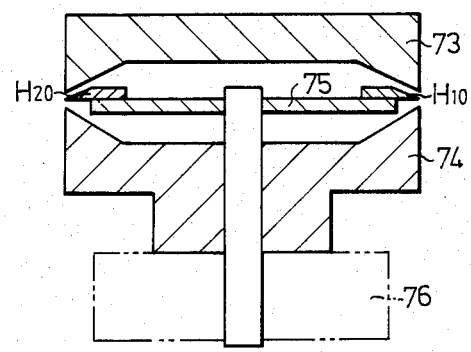

FIG. 13 is a schematic illustration of the cross section of the drum assembly for use the the beta system. The drum assembly comprises stationary drums 73 and 74, rotary bar 75, and a driving motor 76 for driving the rotary bar 75. The rotary recording and reproducing heads H10 and H20 are mounted on the rotary bar 75 in such a manner that the heads H10 and H20 moves along the outer periphery of the stationary drums 73 and 74. The construction in FIG. 13 is also applicable to the VHS system.

In the embodiments aforementioned, transmission of the recording signal and the reproducing signal across the rotary body and the stationary drum is carried out by means of a rotary transformer. However, the drum assembly of the present invention is not limited to such a rotary transformer but a combination of the brush and slip ring as shown in FIG. 2 may also be used.

Figure 14:
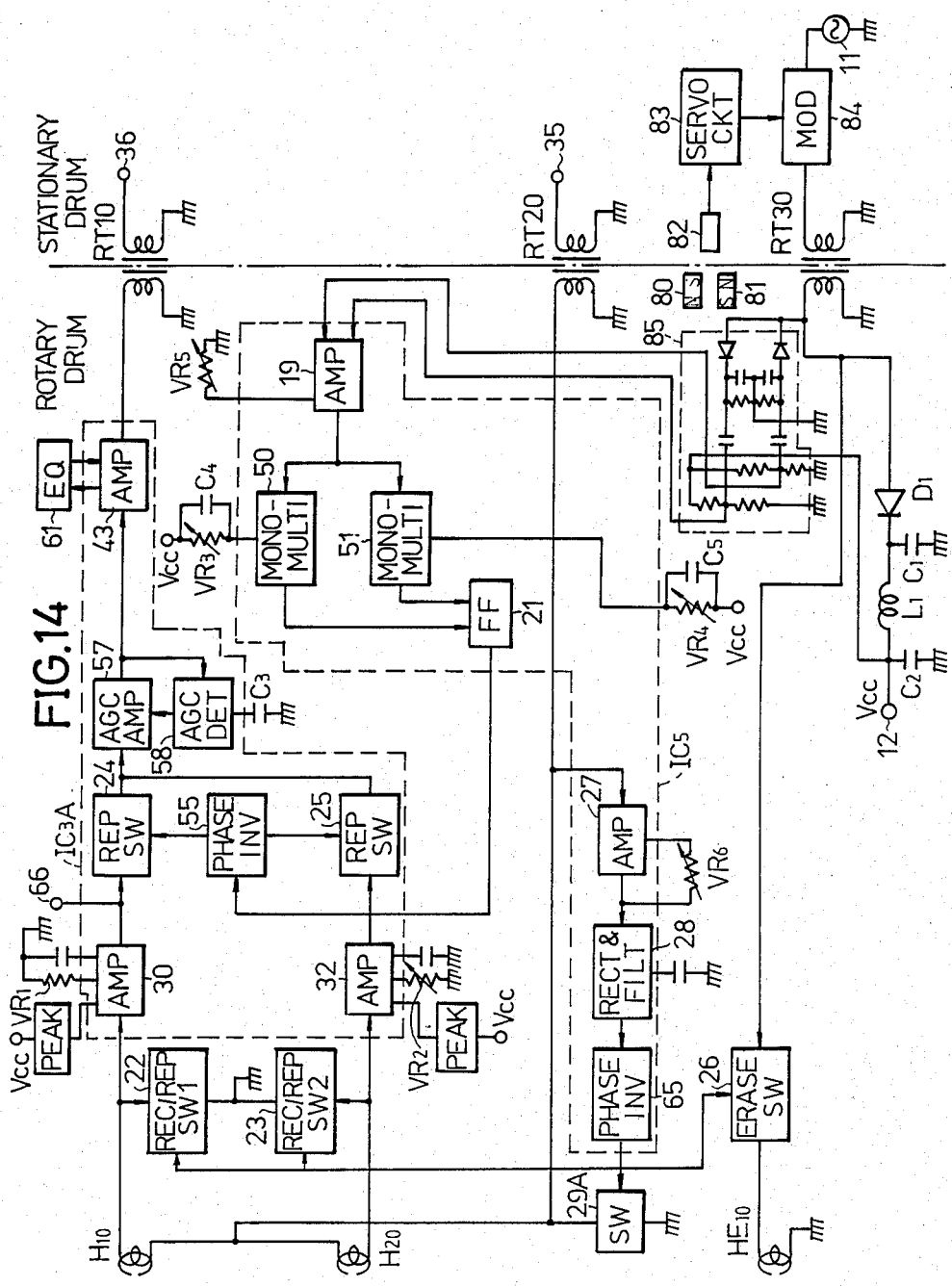
FIG. 14 is a system block diagram showing a modification of the drum assembly of FIG. 11.
Figure 15:
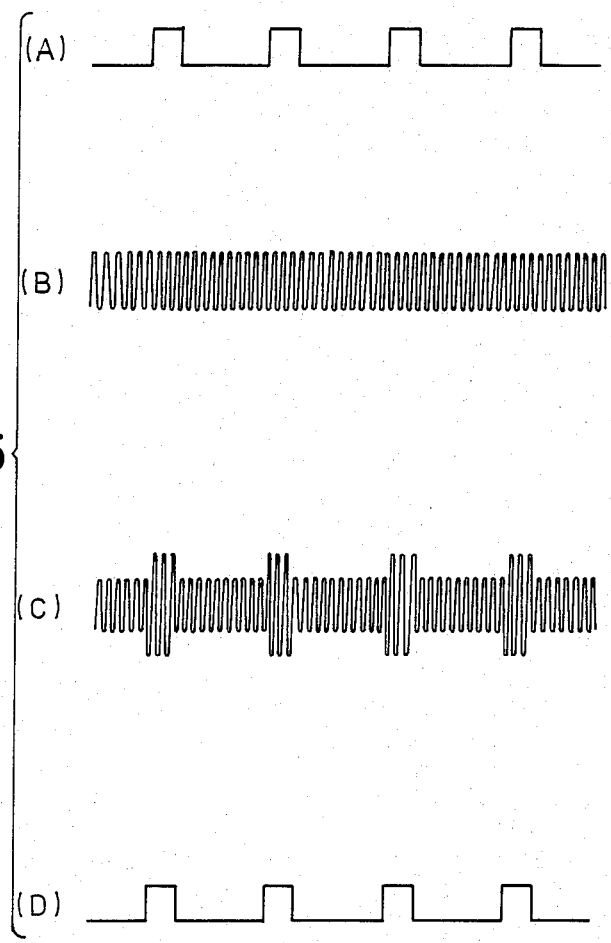
FIG. 15 is a diagram showing wave forms for explanation of the drum assembly in FIG. 14.

FIG. 14 is a system block diagram showing a modification of the embodiment in FIG. 11. In the drawing, those parts constructed identically to those corresponding parts in FIG. 11 are given the identical reference numerals and the descriptions thereof will be omitted. In the embodiment of FIG. 14, magnets 80 and 81 corresponding to the rotary recording and reproducing heads H10 and H20 are mounted on the rotary body in a diametrically opposing manner, in which the magnetic poles of the magnets 80 and 81 are also opposed. Further, a magnetic sensors 82 is mounted on the stationary drum in a corresponding position to the position of the magnets 80 and 81. This magnetic sensor 82 may be a Hall element which detects the magnets 80 and 81 at respective opposing ends of the diameter of the stationary drum and produces an output signal responsive to the detection. The output signal from the Hall element 82 is supplied to a servo control circuit 83 which produces a servo control signal as shown in FIG. 15(A). The servo control signal is then supplied to a modulator 84 which modulates the amplitude of the erasing signal shown in FIG. 15(B) from the oscillator 11 and supplies a modulated signal as shown in FIG. 15(C) to the rotary transformer RT30 from which the modulated signal is transmitted to the circuit portion in the rotary body. The modulated signal is then supplied to the switching circuit 26 as well as to the diode D1 and used as described previously. Further, the modulated signal is supplied to a detecting circuit 85 which produces a positive and negative detection signals by detection and filtering of the modulated signal. The detection signals are then superposed to a direct current voltage and supplied to respective input terminals of the anplifier 19 which is a differential amplifier as in the case of FIG. 11 for amplification. Thus, another servo control signal is obtained from the amplifier 19 as shown in FIG. 15(D) and supplied to the monostable multivibrators 50 and 51. The output signals form the monostable multivibrators 50 and 51 are supplied to the flip-flop 21 which produces the switching control signal responsive to the output signals from the monostable multivibrators 50 and 51. The rotary body is driven by a servo motor (not shown) controlled the rotation thereof by the servo control circuit 83. Therefore, it is necessary to synchronize the servo control signal from the servo control circuit 83 and the switching control signal from the flip-flop 21. In the present embodiment, the switching control signal is obtained from the servo control signal so that the synchronization is automatically achieved. In the embodiment of FIG. 11, on the contrary, the servo control circuit (not shown) is used exclusively for controlling the servo motor and not used for producing of the switching control signal. Thus, the switching control signal had to be obtained from the magnet sensor 17 cooperating with the magnet 15 separately from the servo control signal. Therefore, the present embodiment utilizes the servo control circuit 83 for control of the servo motor and at the same time for producing of the switching control signal. Accordingly, it becomes possible to eliminate the magnet 15 and the magnetic sensor 17 and the circuit construction and the adjustment are simplified.

Figure 17:
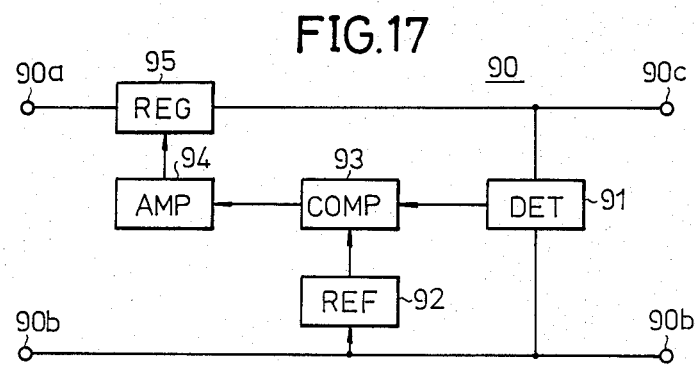
FIG. 17 is a system block diagram showing an embodiment of a regulator used in the drum assembly in FIG. 16.

FIG. 16 is a system block diagram showing a modification of the embodiment in FIG. 14. In the drawing, those parts constructed identically to those corresponding parts in FIG. 14 are given the same reference numerals and the descriptions thereof will be omitted. In the embodiment in FIG. 14, the brush 14a and the slip ring 14b are used for supplying electrical power to the integrated circuits IC3A and IC5. In FIG. 16, a direct current voltage of 7 volt is applied to an input terminal 13. This voltage is then supplied to the slip ring 14b mounted on the rotary body through the brush 14a. The slip ring 14b is associated with a capacitor C11 connected to the ground for noise elimination. The slip ring 14b is further connected to an input terminal 90a of a regulator 90 having a ground terminal 90b connected to the ground and an output terminal 90c connected to the terminal 12. Further, a capacitor C12 is connected between the output terminal 90c and the ground for noise elimination. FIG. 17 shows the schematic system block diagram of the regulator 90 in which the direct current voltage is supplied to the input terminal 90a. This voltage is then passed to the output terminal 90c through the regulating circuit 95. The regulator 90 detects a voltage appearing across the terminals 90b and 90c by a detecting circuit 91 and compares the detected voltage with a reference voltage produced by a reference voltage source 92 by a comparator 93. The comparator 93 produces an error signal which is amplified by an amplifier 94. Output signal of the amplifier 94 is then supplied to a regulating circuit 95 which regulates the voltage across the terminals 90b and 90c at a constant voltage. The regulator 90 may be a model $\mu$PC7805 supplied from Nippon Electric Co., Ltd, in which case a ripple rejection of 90–100 dB can be achieved. In the present embodiment, the direct current supplied from the slip ring 14b is stabilized by the regulator 90 so that the noise which cannot be eliminated completely by the LC filter in FIG. 2 is nearly completely eliminated and a stable electrical power is supplied to the integrated circuits such as IC3A, IC5, and the like.

In such a case that the magnetic recording and reproducing apparatus is a digital audio tape recorder with a rotary recording and reproducing head, the rotary erasing head HE10 is not used and the rotary erasing head HE10 and the switching circuit 26 in FIGS. 1, 5, 8, 10, 11, 14 and 16 can be omitted.

Further, the present invention is not limited to these embodiments, but various variations and modifications may be made without departing from the scope of the present invention.

What is claimed is:

1. A drum assembly for carrying a plurality of rotary recoding and reproducing heads of a magnetic recording and reproducing apparatus for recording and reproducing a signal on and from a magnetic recording medium in a rotative manner relative to a magnetic recording and reproducing apparatus body, said magnetic recording and reproducing apparatus body being provided with a recording and reproducing circuit for producing a recording signal to be supplied to said plurality of rotary recording and reproducing heads and for receiving a reproduced signal from said plurality of rotary recording and reproducing heads, said drum assembly comprising:

a stationary drum fixed on said magnetic recording and reproducing apparatus body;

a rotary body supported on said stationary drum in a rotative manner for carrying said plurality of rotary recording and reproducing heads;

first switching means disposed in said rotary body for selecting one of said plurality of rotary recording and reproducing heads responsive to a rotation of said rotary body;

amplifying means disposed in said rotary body for amplifying said reproduced signal supplied from said plurality of rotary recording and reproducing heads, said amplifying means and said first switching means being integrated into a semiconductor integrated circuit chip;

signal transmitting means provided at an interface between said stationary drum and said rotary body and comprising a first rotary transformer for transmitting said reproduced signal reproduced by said plurality of rotary recording and reproducing heads and amplified by said amplifying means to said recording and reproducing circuit and a second rotary transformer for transmitting said recording signal from said recording and reproducing circuit to said plurality of rotary recording and reproducing means;

electrical power supplying means comprising a brush and slip ring combination disposed at the interface of said stationary drum and said rotary body, said brush and slip ring combination comprising a brush and a slip ring in contact with each other for supplying a direct current to said amplifying means and said first switching means from an electrical power source provided in said recording and reproducing circuit;

a servo control circuit disposed in said stationary drum for controlling said rotation of said rotary body, said servo control circuit further producing a rotation detection signal;

a modulator for modulating amplitude of an erasing signal by said rotation detection signal obtained by said servo control circuit;

a detector disposed in said rotary body and supplied with said amplitude modulated erasing signal through a third rotary transformer for detecting said rotation detection signal, said rotation detection signal detected by said detector being supplied to said first switching means as a switching control signal; and a regulator disposed in said rotary body for regulating said direct current supplied through said brush and slip ring combination and for producing a stabilized direct current output, said stabilized direct current output being supplied to said amplifying means and said first switching means.

2. A drum assembly as claimed in claim 1 in which said first switching means selects one of said plurality of rotary recording and reproducing heads responsive to a switching control signal produced by a magnetic sensor mounted on said rotary body for sensing a movement of a magnet mounted on said stationary drum and rotating with rotation of said rotary body.

3. A drum assembly as claimed in claim 1 in which said signal transmitting means comprises a fourth rotary transformer electrically connected to said recording and reproducing circuit for transmitting said recording signal and said reproducing signal, said drum assembly further comprising second switch means disposed in said rotary body for supplying said recording signal supplied thereto from said rotary transformer to said plurality of rotary recording and reproducing heads in a recording mode and for supplying said reproduced signal reproduced by said plurality of rotary recording and reproducing heads and amplified by said amplifying means to said fourth rotary transformer in a reproducing mode.

* * * * *